Aug. 21, 1928.
C. J. WILLIAMS
HAIRPIN FOR BOBBED HAIR
Filed Nov. 8, 1926
1,681,271
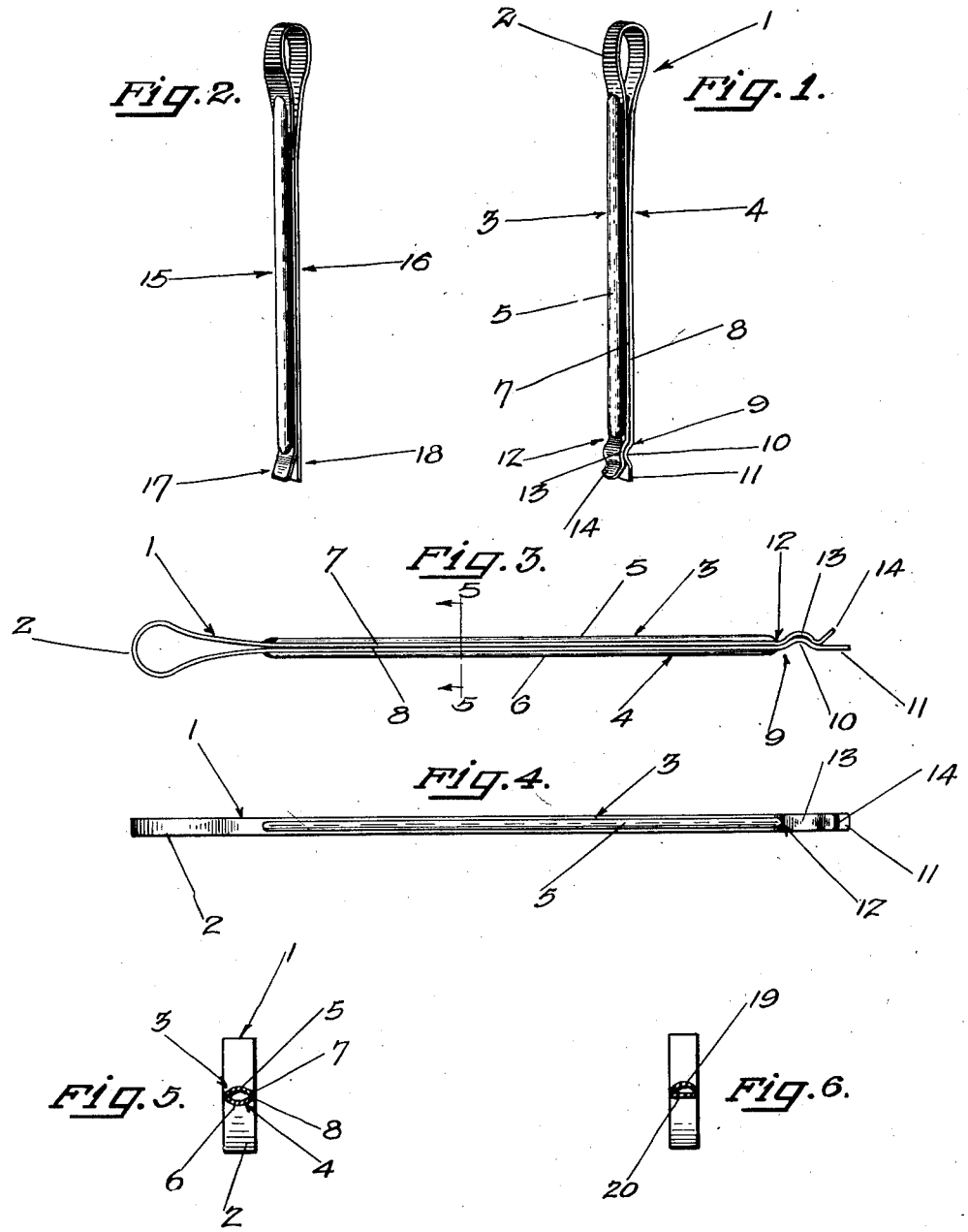
INVENTOR
Clarence J. Williams
BY Graves Griffith
ATTORNEY Patented Aug. 21, 1928.

1,681,271

UNITED STATES PATENT OFFICE.

CLARENCE J. WILLIAMS, OF SAN FRANCISCO, CALIFORNIA, ASSIGNOR, BY DIRECT AND MESNE ASSIGNMENTS, TO CARRIE G. BURBANK, OF OAKLAND, CALIFORNIA.

HAIRPIN FOR BOBBED HAIR.

Application filed November 8, 1926. Serial No. 146,931.

The present invention relates to improvements in hairpins, and more particularly to those of that class now universally employed by women for retaining in positioned arrangement the side locks of their bobbed hair.

A primary object of the present invention is the provision of a hairpin of the class designated that is provided with a spring-loop bearing projecting tines the contacting surfaces of which are fluted longitudinally to provide positive gripping edges adapted to securely grip hair strands and retain their hold thereon without risk of working loose.

A further object of the invention is the provision of a hairpin having fluted gripping tines provided at their extremities with interlocking means adapted, when the pin is in place upon the hair, to interlock and prevent the pin's displacement until the wearer desires it, this being readily accomplished by a simple distension of the tines.

An additional object of the invention is the provision of a hairpin constructed from a single strip of resilient spring material that is of cheap manufacture, durable, and of neat and attractive appearance.

Other objects and advantages will appear as this specification progresses, and be more clearly brought out in the claims hereto appended.

In the accompanying drawings, forming a part of this specification and in which similar characters of reference designate like parts, throughout:

Figure 1 is a perspective view upon a greatly enlarged scale, showing a hairpin embodying the principles of my invention;

Figure 2 is a perspective view, slightly modified as to form;

Figure 3 is an edge view, showing the pin in closed position relative to its tines, these being shown with their extremities provided with interlocking means adapted, when in contact as indicated, to prevent the pin being pulled off the gripped hair strands;

Figure 4 is a plan view of the pin as shown in Figures 1 and 3;

Figure 5 is a cross-section taken through the fluted gripping tines, showing their outer longitudinal edges in closed relation and contacting for the efficient gripping of the hair, this section being indicated by the line 5—5 of Figure 3; and Figure 6 is a sectional detail, showing a modified form in which only one of the tines is fluted, the other being of flat construction.

Referring to the drawings in detail, and with reference more particularly to Figures 1, 3, 4 and 5, in which preferred embodiments of my hairpin have been shown, 1 indicates in a general way the pin proper, preferably formed from resilient ribbon steel bent upon itself to form the spring loop 2 and the gripping tines 3 and 4.

In the formative process of the pin, the tines 3 and 4 are preferably brought together until their inner surfaces are in substantially perfect contact throughout something more than two-thirds of their length, the longitudinal fluting being accomplished either previous to or during the forming operation, the tine fluting being indicated at 5 and 6 and adapted to afford longitudinal side gripping edges 7 and 8 lying in close contacting relation, as is clearly indicated in Figure 5. The extremity 9 of the tine 4 is provided with a transverse ridge 10 and an outwardly projecting tang 11, and the tine 3 at its extremity 12 with a transverse depression 13 and an angularly projecting tang 14 slightly shorter than the tang 11 to provide a notch for finger-nail insertion to facilitate distension of the tines of the pin when desired. The depression 13 of the tine 3 is normally adapted to remain seated upon the ridge 10 of the tine 4 to assist in retaining the hair in place and preventing the pin from working loose from the gripped hair strands.

In the form shown in Figure 2, the tines 15 and 16 are shown as being fluted and the extremities 17 and 18 of ordinary construction, while in the modified form, as shown in Figure 6, the tine 19 is shown as being fluted, with the other 20 remaining flat as in the usual construction.

Having thus described my invention, I claim, and desire to secure by Letters Patent:

1. A hairpin consisting of a spring-loop portion and outwardly projecting tines having opposed flutes with the concavity of the one facing the concavity of the other and formed from a single piece of flat spring material, the extremities of said tines being provided, respectively, with a ridge and a depression adapted to fit the one within the other to form interlocking means adapted to prevent the displacement of the pin.

2. A hairpin consisting of a spring-loop portion and integrally formed outwardly projecting tines formed from a single piece of flat spring material, longitudinal flutes formed in said tines and disposed with concavity facing concavity and provided with longitudinally extending gripping edges, and interlocking means borne by the extremities of said tines adapted to prevent the displacement of said pin.

3. A hairpin consisting of a spring-loop portion and integrally formed tines formed from a single piece of flat material, said tines being fluted longitudinally with the flute of one tine arranged in opposition to that of the other tine and providing longitudinally extending and oppositely arranged gripping edges.

4. A hairpin consisting of a spring-loop portion and an integrally formed tines portion, said tines being provided at their extremities with interlocking means and bearing longitudinally opposed flutes extending throughout the greater part of their length and having their contiguous edges forming hair gripping members.

5. A hairpin consisting of a spring-loop portion and integrally formed tines shaped from a single strip of ribbon steel, said tines being provided with flutes of opposite disposition extending longitudinally throughout the greater portion of their length, the extremities of said tines being provided with interlocking members, one member of which has its end flared to facilitate the application of the pin to the hair.

In testimony whereof I hereunto affix my signature.

CLARENCE J. WILLIAMS.